United States Patent
Duque-Anton et al.

[19]

[11] Patent Number: 6,076,116
[45] Date of Patent: Jun. 13, 2000

[54] LOCAL AREA NETWORK COMPRISING DISTRIBUTED SWITCHING SOFTWARE

[75] Inventors: Manuel Duque-Anton; Ralf Günther; Thomas Meuser; Raschid Karabek, all of Aachen, Germany

[73] Assignee: U.S. Philips Corporation, New York, N.Y.

[21] Appl. No.: 09/017,916

[22] Filed: Feb. 3, 1998

[30] Foreign Application Priority Data

Feb. 5, 1997 [DE] Germany .......................... 197 04 288

[51] Int. Cl.[7] ...................................... G06F 13/00
[52] U.S. Cl. .......................................................... 709/251
[58] Field of Search ...................... 364/DIG. 1 MS File, 364/DIG. 2 MS File; 370/400, 438; 709/100, 105, 200, 201, 223, 234, 238, 242, 243, 251

[56] References Cited

U.S. PATENT DOCUMENTS 4,470,140  9/1984  Coffey ...................................... 370/400
5,107,492  4/1992  Roux et al. .............................. 370/438

FOREIGN PATENT DOCUMENTS 19532421  12/1996  Germany ........................ H04L 12/56

Primary Examiner—Robert B. Harrell

[57] ABSTRACT

The invention relates to a local area network comprising at least a ring system which includes a plurality of network nodes coupled via ring connections, which nodes are used for coupling to a station or a network node of another ring system and for switching packets generated by a station or a network node. Switching software is provided distributed over all the network nodes and stations and at least sufficient for the switching operations. The distributed switching software renders an object available for each respective application, which object is combined to a respective component of object framework software for object registration and routing the messages to and from the object. The distributed switching software in each network node and each station is represented as a distribution plane entity which is used for transmitting and controlling the messages between objects in a station or a network node and another distribution plane entity.

10 Claims, 10 Drawing Sheets

LOCAL AREA NETWORK COMPRISING DISTRIBUTED SWITCHING SOFTWARE

FIELD OF THE INVENTION

The invention relates to a local area network including a plurality of network nodes, in which a network node is coupled to a station and/or another network node and is provided for switching packets generated by a station or a network node.

BACKGROUND OF THE INVENTION

A local area network (LAN) for packet transfer is known from DE 195 32 421 C1. The packet transfer system operates in the asynchronous transfer mode. The local area network includes a plurality of ring systems with one or two rings. A ring system includes a plurality of network nodes which are coupled either via station terminals to a station, or via a network node of another ring system and which are used for switching cells generated by a station or by a network interface. Cells containing address information about the destination, for example, of a certain station are transmitted over a ring. The control procedures in a network node are carried out by at least one controller which is to contain sufficient software structured according to hardware requirements.

When an asynchronous transfer mode is used in a system, payload information, for example television, picture or sound signals are transmitted in fixed-length blocks by arrangements for digital signal processing. A fixed-length block is understood to mean a cell which contains a predefined number of bytes (53 bytes). Each cell includes a header field having a length of 5 bytes, and an information field in which the payload information is accommodated having a length of 48 bytes. In such a header field are contained address information, data for error detection and data for control indication bytes. Address information includes virtual path identifiers and virtual channel identifiers. For transmitting a cell, a virtual channel is rendered available based on the virtual channel identifier (VCI). As a rule, a VCI is changed once a switching center has been reached. A trunk of a plurality of virtual channels is designated a virtual path identifier VPI which is featured by the trunk identifier.

Those skilled in the art are directed to: M. Elixmann et al: "Open Switching—Extending Control Architectures to Facilitate Applications, Proc. of ISS'95, vol. Apr. 2, 1995, pp. 239–243.

The above citations are hereby incorporated in whole by reference.

SUMMARY OF THE INVENTION

Therefore, it is an object of the invention to provide a local area network in which software applications run which are irrespective of the hardware on which the software is based.

The object of the invention is achieved by a local area network of the type defined in the opening paragraph, in that switching software is provided which is sufficient at least for the switching and distributed over all the network nodes and stations, in that the distributed switching software renders an object available for each respective application, which object is combined with a component of object framework software for object registration and for routing messages to and from the object, and in that the distributed switching software is represented on each network node and each station as a distribution plane entity which is used for transmitting and controlling the messages between objects in a station or between a network node and another distribution plane entity.

The local area network according to the invention contains distributed switching software which controls the communication between the various system sections. A system section is a network node or a station. For an application in the local area network it is necessary to render a software object available in the respective system section. An application is, for example, a signalling function, a monitoring function, and so on. The object is then to be arranged in the system section in which the function is necessary. A component of object framework software used for routing the streams of messages to and from the object and for object registration is assigned to an object. An object and the assigned component of the object framework software are called an embedded object. The communication between the embedded objects is carried out via other software components which are called distribution plane entities. A distribution plane entity is to be available in each system section, whereas the other objects are to be available only in one such system section where it is to be used. The transmission of a message from an object of a first network node to an object of a second network node is effected via the respective assigned distribution plane entities. The communication between two objects of a system section, on the other hand, is carried out only via the assigned distribution plane entity.

As a result of this structuring of distribution software which does not depend on hardware and applications, the objects may be distributed over a plurality of network nodes and thus make a parallel and local processing of partial problems possible in a more efficient way. In the local area network this distributed switching software allows performing a central switching function, although the switching function as regards hardware is distributed over the local area network in the individual network nodes. The development of software applications may take place independently of the basic hardware and thus simplify and speed up the development.

It should be pointed out that such a local area network may also including network nodes which have wireless ring connections. The ring connections are in that case established, for example, via radio, infrared or ultrasonic receivers and transmitters.

The claims 2 and 3 relate to the property of the object framework software and the single components which are assigned to an object. An object and an assigned component of object framework software are designated an embedded object. The claims 4 to 7 relate to the distribution plane entity and its components.

Those skilled in the are will understand the invention and additional objects and advantages of the invention by studying the description of preferred embodiments below with reference to the following drawings which illustrate the features of the appended claims.

DETAILED DESCRIPTION OF THE PREFERRED EMBODIMENTS

Figure 1:
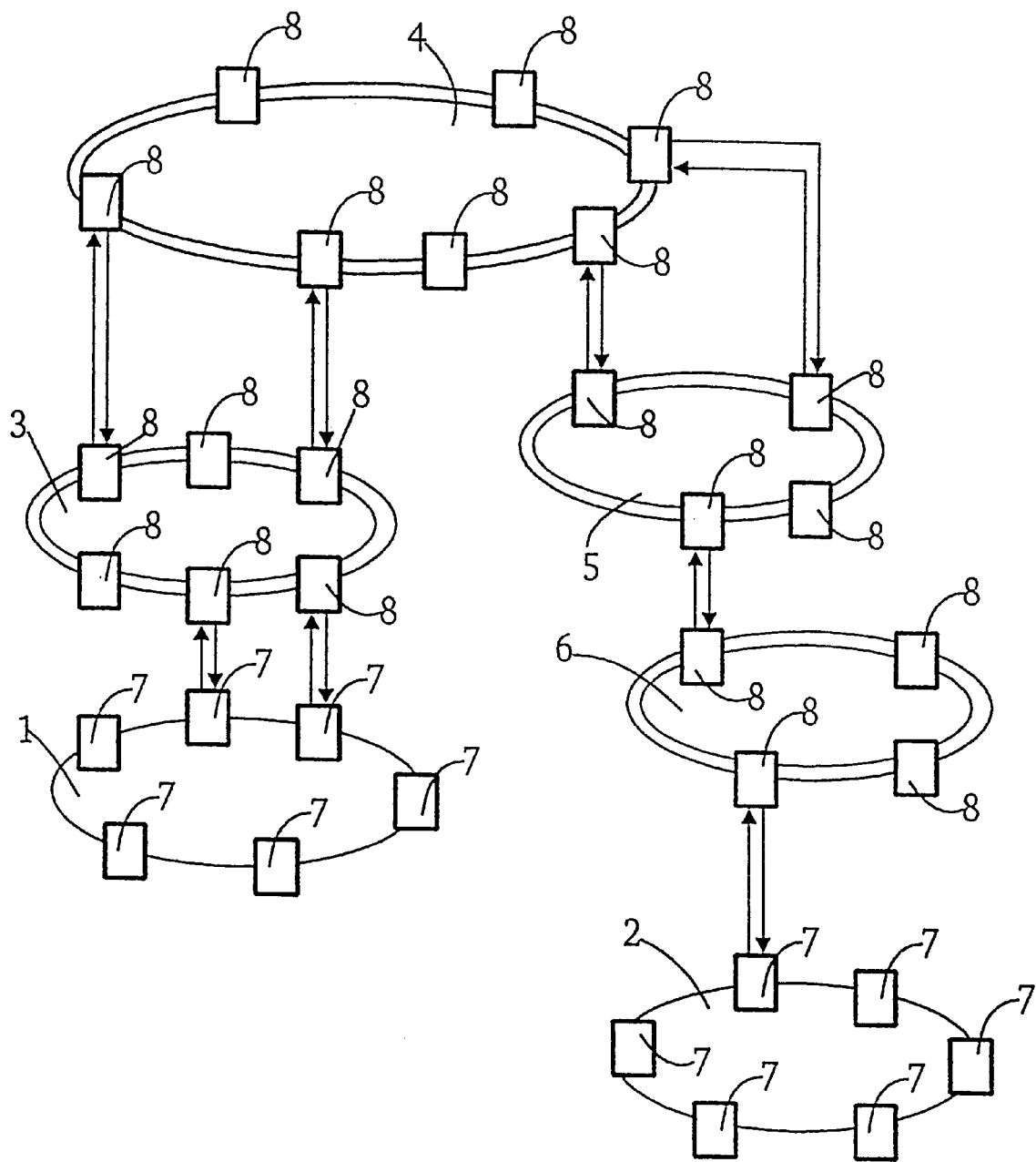
FIG. 1 shows a local area network.

In FIG. 1 is shown an exemplary embodiment of a local area network including six ring systems 1 to 6. A ring system 1 to 6 may be formed either by one or by two rings. The ring systems 1 and 2 include one ring and the ring systems 3 to 6 two rings. A ring is understood to mean a closed signal path via a plurality of network nodes 7, 8, respectively. The ring systems 3 to 6 each form two rings moving in opposite directions, that is to say, the signals in the rings run in opposite directions. A network node 7, 8 respectively, which is represented in the ring systems 1 to 6 as a rectangle, has two or four ring connections and may have two station connections.

Either a station or a network node 7, 8 of another ring system is connected to the station connections. Station connections are shown in FIG. 1 only for the network nodes 7 and 8 which have a connection to another network node. For example, for the ring system 4, FIG. 1 shows a total of three network nodes connected only to stations of ring system 4 and four network nodes to network nodes of the ring systems 3 and 5. A station may be, for example, a telephone, videophone, a personal computer or a worksta- tion. The messages or information, coming from the stations or network nodes respectively, are transferred in the asyn- chronous transfer mode by means of cells. A cell contains a header field with 5 bytes and an information field with 48 bytes. The information contained in the header field of the cell is particularly used for seeking the path and for carrying out switch functions.

Figure 2:
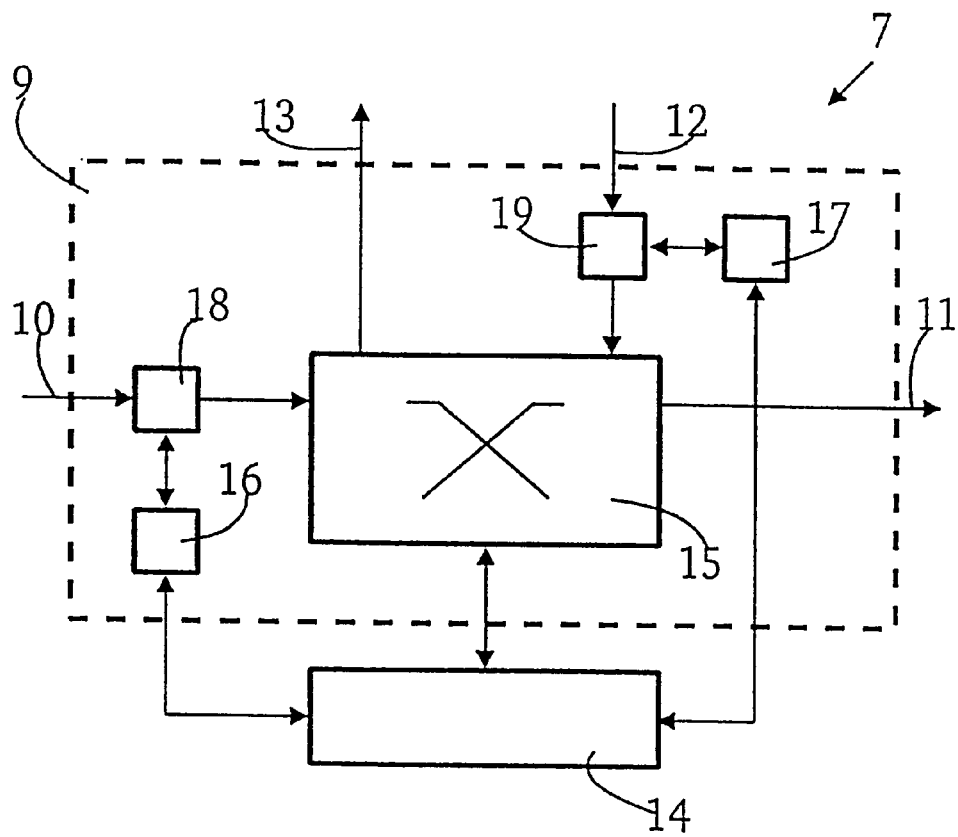
FIG. 2 shows a network node with 2 ring connections used in the local area network shown in FIG. 1.

A network node 7 including a circuit element with two ring connections is shown in more detail in FIG. 2. The network node 7 includes a switch 9 which is coupled to ring and station connections 10 to 13 and transfers the cell stream. The switch 9 receives a cell stream from another network node over the ring connection 10 and from a station or a network node of another ring system over the station connection 12 and conveys the cell stream over the ring connection 11 to another network node and over the station connection 13 to another station or a network node of another ring system.

The network node 7 further includes a controller 14 controlling the switching center 9, which controller 14 is, for example, a microprocessor and also receives and generates cells. In the switching center 9 further occurs a switch 15, two path memories 16 and 17 and two receiving circuits 18 and 19. The header fields of cells coming in through connections 10 and 12 are evaluated in the receiving circuits 18 and 19, respectively.

Address information contained in the header field is used for addressing various tables for the path memories 16 and 17 connected to the receiving circuits 18 and 19. The data stored in the tables are used for the receiving circuits 18 and 19 to organize the further processing and routing of the cell. For example, the receiving circuit 18 may copy the cell and add new address information thereto. The original cell is passed on to the station connection 13, for example, via the switch 15 and the copied cell is passed on to the ring connection 11 via the switch 15. There is also the possibility that the switch 15 performs this copy function.

The receiving circuit 18 is coupled to the ring connection 10 and conveys received cells to the switch 15. The path memory 16 is connected to the receiving circuit 18. Between the switch 15 and the station connection 12 is inserted the receiving circuit 19 which is connected to the path memory 17.

Two types of payload cells are transmitted over the ring connections 10 and 11 of the ring and over the station connections 12 and 13. On the one hand, user cells which carry, for example, messages or data of the user of a previously established connection in their information field and, on the other hand, signalling cells which carry, for example, signalling information in their information field.

Figure 3:
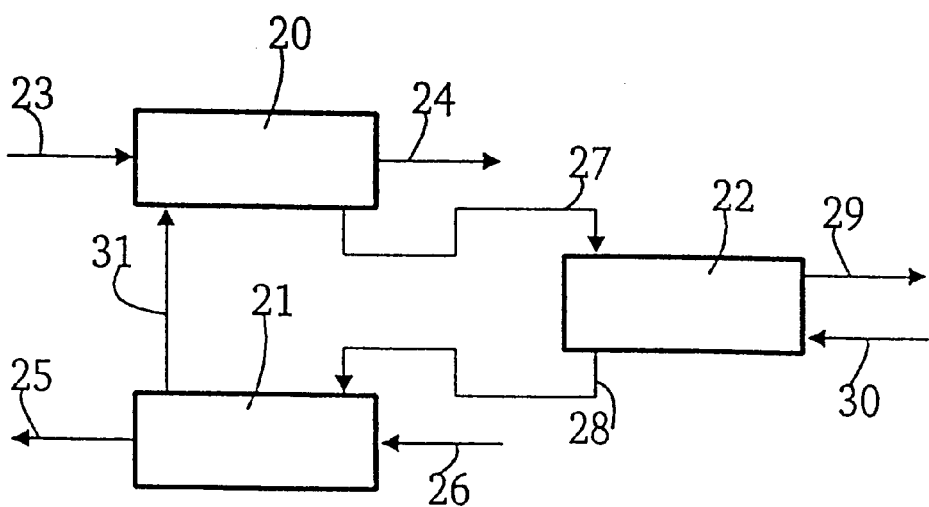
FIG. 3 shows a network node with 4 ring connections used in the local area network shown in FIG. 1.

A network node with four ring connections may be formed by three circuit elements each having two ring connections as shown in FIG. 2. FIG. 3 shows three circuit elements 20, 21 and 22. The ring connections 23 and 24 of the circuit element 20 and the ring connections 25 and 26 of the circuit element 21 also form ring connections when interconnected in this manner. The station connection 27 of the circuit element 20 is the ring connection of the circuit element 22 whose station connections 29 and 30 are also the station connections when interconnected in this manner. The further ring connection of the circuit element 22 is con- nected to the station connection 28 of the circuit element 21. The station connection 31 further connects the two circuit elements 20 and 21.

A network node thus conveys cells from one ring con- nection to the other ring connection of the same ring, to a station connection, or also in the case of four ring connections, to the ring connection of the other ring. A cell on a station or station connection is transferred to a ring connection. Cells may also be received and transmitted by the controller of a circuit element.

Certain bits in the header field of the cell are reserved for the virtual channel identifier (VCI). The VCI indicates, according to standardization proposals, the destination of a cell and thus indicates a virtual channel. Certain bits in the header field of the cell are further reserved for the VPI (virtual path identifier), which is a trunk of a plurality of virtual channels. According to current standardization speci- fications 8 bits in the header field of the cell are reserved for the VPI and 16 bits for the VCI.

The VCI and the VPI are used for other information in this exemplary embodiment than according to the standardiza- tion proposals. The VPI contains information about the address (address information) or the destination (network node) respectively, of a cell in a ring system. The VCI is used for indicating via the user-related identification code for a connection, the type of the connection and the type of cell. Furthermore, the VCI is used as an address for a ring system.

The path memories 16 and 17 of the circuit element of node 7 in FIG. 2, contain information which is evaluated by the assigned receiving circuits 18 and 19 for organizing the further processing and routing of the received cell. For example, a cell may receive another address, may be copied or erased. The path memories 16 and 17 may be changed by the controller 14, for example, in the case of an error or as a result of certain information of the network management system.

In a connection between a network node of a first ring system and a network node of a second ring system, the VPI and the VCI are to be changed when a cell moves from one ring system to another ring system. For this purpose, certain entries in the path memories have been stored prior to the connection set up.

Figure 4:
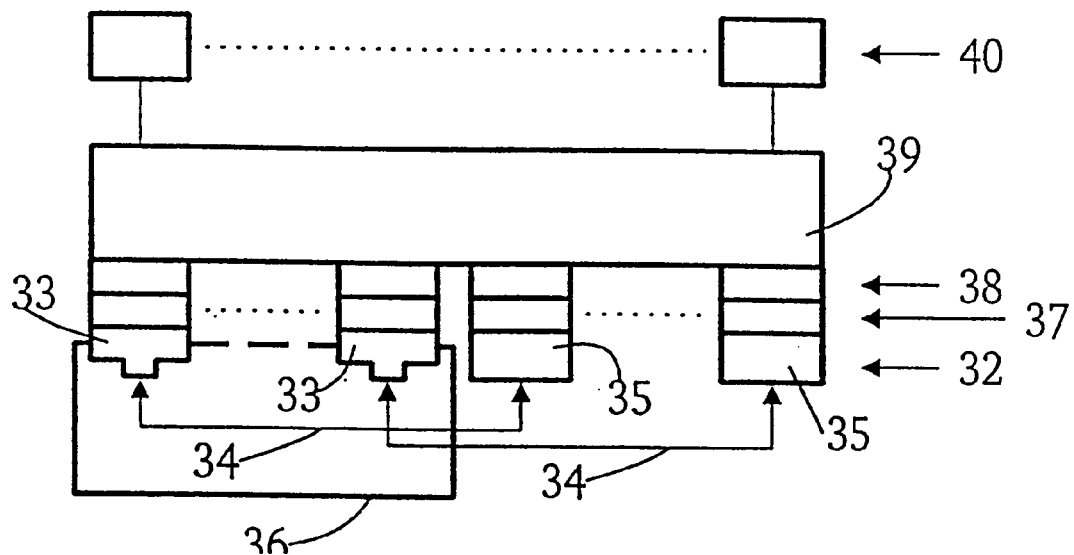
FIG. 4 shows a layer model about the software used in the local area network.

For the various tasks of the network nodes 7, 8, in the local area network, various software components are necessary. The software architecture in the local area network may be explained with reference to the layer model shown in FIG. 4. The lower layer or first layer 32 forms the physical layer (hardware) which includes the network nodes 33 and the stations 35 connected to the station connections 34 of the network nodes 33. In the FIG. 4 is shown only one ring for simplicity. The hardware, however, may include a plurality of rings—as shown in FIG. 1. The second layer 37 forms the operating system. As an operating system may be used, for example, "pSOS" made by "Integrated Systems INC). The third layer 38 includes hardware-specific software (firmware) for the network nodes 33, or driver software for the stations 35. The function of the firmware is the execution of control operations in the network node 33 such as, for example, receiving cells and transmitting them and changing the entries in the path memories 16 and 17 (FIG. 2).

The fourth layer 39 contains the software which connects the network nodes 33 and the stations 35 and is distributed over various network nodes 33 and stations 35 depending on the respective switching task and switching function and is denoted distributed switching software. The distributed switching software has open interfaces for interleaving application programs (compare for this purpose: M. Elixmann et al: "Open Switching—Extending Control Architectures to Facilitate Applications, Proc. of ISS'95, vol. Apr. 2, 1995, pp. 239–243). These application programs form the fifth layer 40 in the layer model of FIG. 4.

Figure 5:
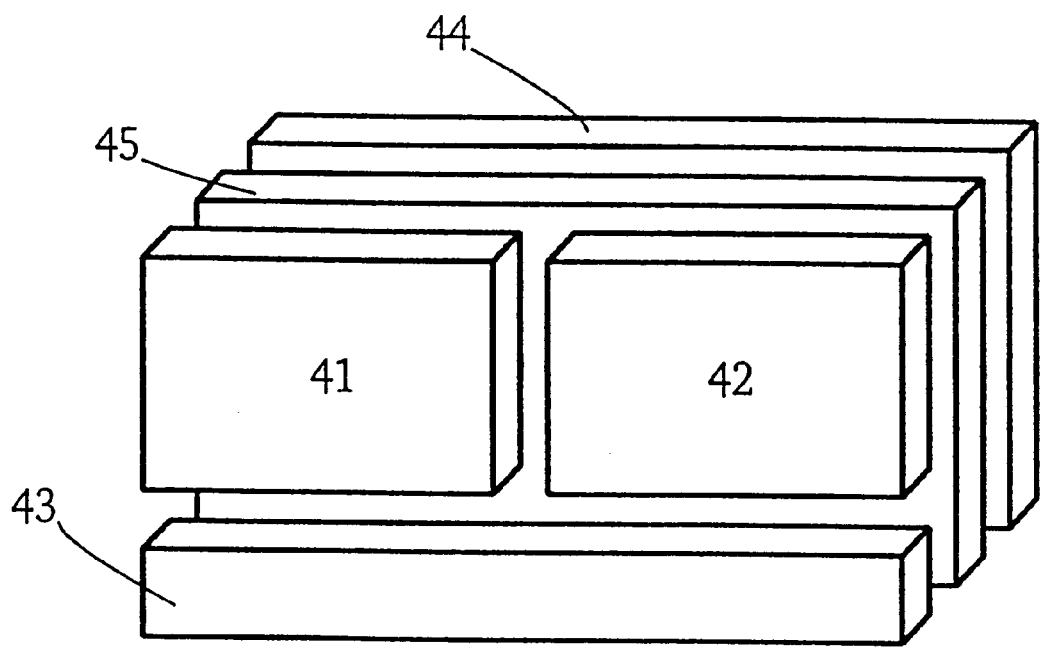
FIG. 5 shows the architecture of distributed switching software which forms part of the software shown in FIG. 4, FIG. 6 gives a diagrammatic representation in explanation of the object framework software which forms part of the distributed switching software, FIG. 7 gives a diagrammatic representation in explanation of the function of the distribution layer which forms part of the distributed switching software, FIGS. 8 and 9 give diagrammatic representations in explanation of the function of the distribution plane entity which forms part of the distribution layer.

The architecture of the distributed switching software may be explained with the aid of FIG. 5. For the switching applications, it is sufficient to have control software 41 and management software 42. The control software 41 organizes, for example, the signalling or switching functions respectively, in the local area network and the management software 42 performs, for example, network management functions such as error processing, security aspects, etc. The software components 41 and 42 access information management software 43 (information repository software) which stores data for the two components 41 and 42, renders them available and will be denoted information repository software 43 in the following. These data are transmitted over a shared software interface. Furthermore, the information repository software 43 additionally stores the system status utilized in common by the control and management software 41 and 42. For example, the system status indicates error rates or also in what operating mode a hardware component is. When the system status changes, this is stored in the respectively involved hardware and firmware and in a mirror-inverted manner in the information repository software 43.

The control, management and information repository software 41, 42 and 43 comprises a plurality of software objects which exchange messages without knowing the location of the respective communication partner (other object). Such an exchange is made possible by software distributed over the whole local area network, which will be referenced distribution plane 44 in the following and which makes the communication possible with other objects via the software components 41 to 43.

Not only do the control and management software 41 and 42, the information repository software 43 and the distribution plane 44 belong to the distribution switching software, but also object framework software 45 which assigns an object framework to each object. An object registration and a communication between objects is made possible with the object framework software 45.

In the distributed switching software are used objects which have the functions to be described hereinafter. At the beginning of the useful life of an object, this object reports its presence and its methods to the distribution plane 44 which renders the object accessible to other objects. Once an object and its methods have been registered, the object may communicate with any other already registered object of the distributed switching software. The object framework software renders references available to an object, by which references other objects are addressed. With a first call, an object needs to have a reference of the distribution plane 44. After the initialization, the reference is stored and used for the following times the same object calls the method. The calling of a method of an object in another object is made in that a message is transmitted. This message shows the other (remote) object, the called method and the respective parameters.

The objects described in the preceding paragraph will be called embedded objects in the following and are a basic element of the distributed switching software. The object framework software renders the necessary environment for an embedded object available. Embedded objects have at least a thread for processing messages via a method call by other objects. Also objects having a plurality of threads may be called, in which method calls are carried out in parallel.

Figure 6:
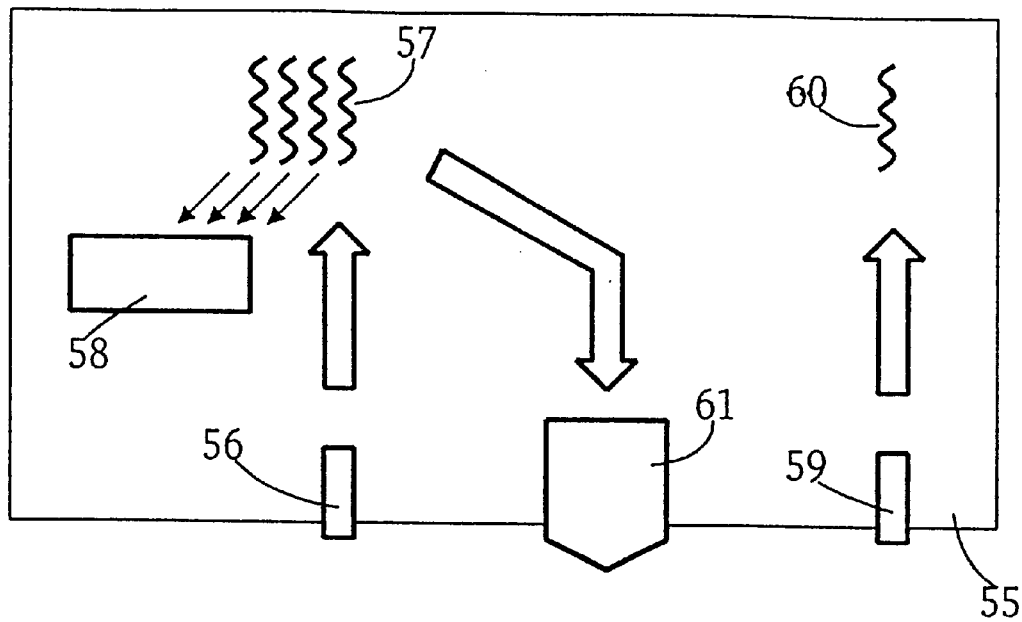

The function of the object framework software will be explained in more detail in FIG. 6. An object framework is symbolically represented as a rectangle 55 in FIG. 6 and processes various message streams. First will be explained, the message streams from the distribution plane 44 to the object framework software 45. First messages for invoking a method (method invocation messages) of an object, which object surrounds the object framework, are sent to the embedded object via an invoke queue 56 to invoke an object method. The arriving messages are processed by threads 57 for the execution of the methods (method execution threads). For determining the object method, a list 58 for the externally callable methods (an external callable method list) is searched. The method execution threads 57 call the respective method once this method has been found in the list 58.

Further messages are added to a reply queue 59 of the object framework. Once the embedded object assigned to the object framework has invoked a method in another object, this other object sends a reply (replies to method invocation messages) via the reply queue 59 to a thread 60 for handling the reply (reply handler thread) of the object framework. The threads 57 for executing the methods, which wait for this reply, are determined and the message contents of the thread 60 are transmitted to the threads 57.

A further message stream (requests to the distribution plane) runs from the object framework software 45 to the distribution plane 44. As a result of a message to the distribution plane 44 about a specific object which is referenced a stub object 61, the registration of an embedded object and its method is executed.

The object framework software 45 and the distribution plane 44 are software components relating to each other. As observed above, the object framework software 45 makes it possible to use software components as embedded objects. The distribution plane 44 is used for the communication of the embedded objects. The distribution plane 44 is the component of the distributed switching software which distributes the message streams between objects. Furthermore, the distribution plane 44 knows the various objects and knows on which system section it has been installed. A system section is understood to mean a station or a network node. The functions of the distribution plane 44 are realized by interactions of autonomous distribution plane entities which are found on each system section. Each distribution plane entity has the functionality of a name server and a distributor. For efficiency's sake, the two functionalities in each distribution plane entity do not consist of embedded objects. They utilize, for example, a shared memory area.

The distributor is responsible for conveying received messages which come in from the firmware or from objects. Incoming messages are routed either to the embedded objects which are found on the assigned system section, or to the assigned firmware which organizes the sending of messages over the ring.

The information on all the registered objects is stored in a system section by the name server. The whereabouts of an object are stored in a local object table which is available in each system section. All the object tables together provide the information about all the registered objects in the local area network (total system). The name server provides the information about the whereabouts of a certain object.

Figure 7:
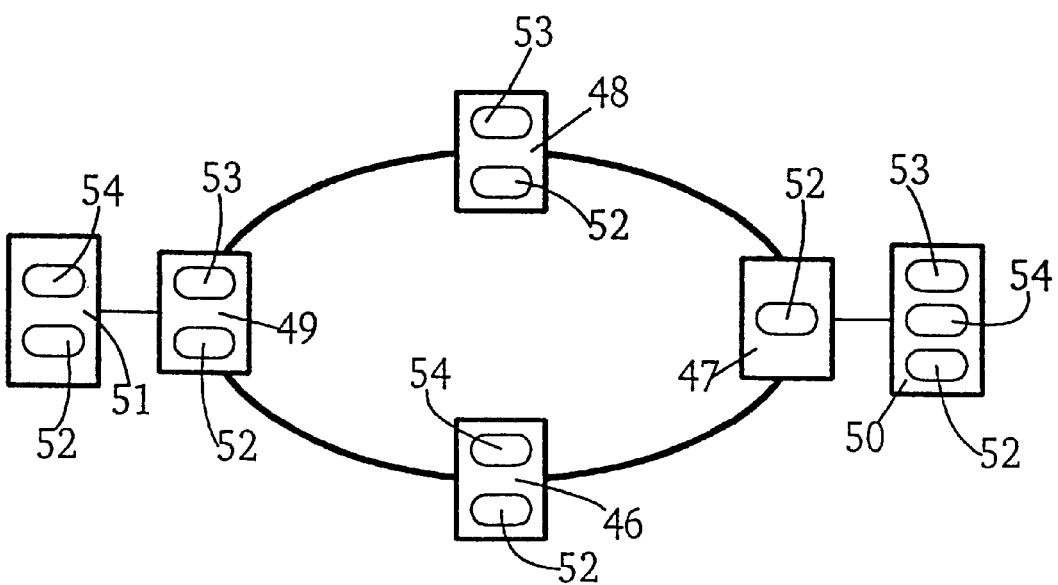

The task and the function of the distribution plane entity may be further explained with reference to FIG. 7 which shows four network nodes 46 to 49 which are coupled via a ring. For example, a personal computer (PC) 50 is connected to the network node 47 and a workstation 51 to the network node 49. Each system section (network nodes 46 to 49, personal computer 50 and workstation 51) includes a distribution plane entity 52 of the distribution plane 44. In contrast thereto, the control and management software 41 and 42 and the information repository software 43 are distributed over a plurality of embedded objects which, however, need not of necessity occur in each system section. In FIG. 7, for example, the control software 41 in the network nodes 48 and 49 and in the personal computer 50 occurs as an embedded object 53 and the management software 42 in the network node 46, the personal computer 50 and the workstation 51 as an embedded object 54.

The distribution plane 44 has several external software interfaces, for example, for firmware and for object framework software 45. Between the distribution plane entities there are internal interfaces. The firmware has a message-oriented interface for the distribution plane 44. The distribution plane entities make use of the firmware to send information about cells, for example, to other system sections or receive information from other system sections. An object frame communicates only directly with the distribution plane entities which are located on the same system section. Furthermore, an object frame is competent of informing the distribution plane 44 about the initialization of an object and of the presence of an embedded object.

Figure 8:
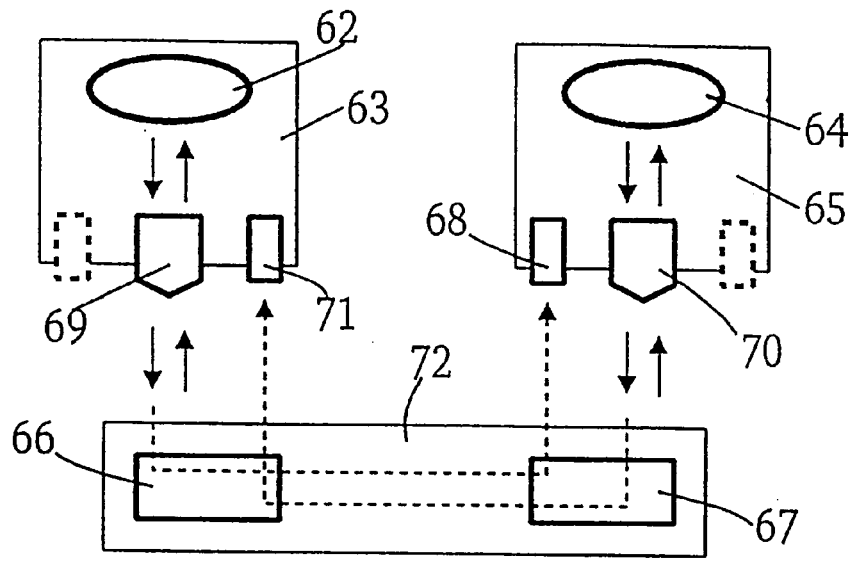

FIG. 8 is used for explaining the communication between object framework software 45 and distribution plane 44. A first embedded object 62 on a first network node 63 communicates with a second embedded object 64 on a second network node 65. The first embedded object adds a message to the invocation queue 68 of the embedded object 64 to invoke a method via a first distribution plane entity 66 assigned to the network node 63 and a second distribution plane entity 67 assigned to the network node 65. The first embedded object 62 then utilizes a stub object 69 to send the message from the embedded object 62 to the distribution plane entity 66. The reply from the embedded object 64 is sent via its assigned stub object 70 and the distribution plane entities 67 and 66 to a reply queue 71 assigned to the embedded object 62. The distribution plane 44 which includes the distribution plane entities 66 and 67 is shown as a rectangle 72 in FIG. 8. The messages between the distribution plane entities 66 and 67 are transmitted over the ring via cells. Thus, the communication between distribution plane 44 and hardware takes place via the firmware.

As is shown in FIG. 8, the distribution plane includes a plurality of distribution plane entities. However, only one distribution plane entity is available per system section. Each distribution plane entity runs as a process with various threads, the communication to the object frame being effected via message-oriented interfaces (stub objects).

Figure 9:
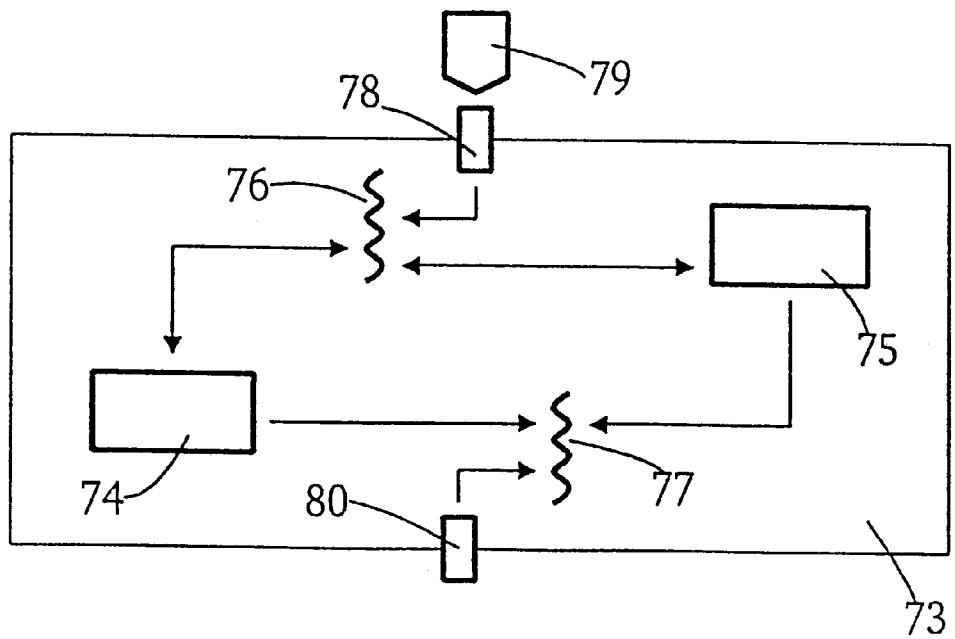

Each distribution plane entity 73 contains two tables 74 and 75, is shown in FIG. 9. The table 74 stores the embedded objects of a system section. Each object belongs to a specific class. The other table 75 is used for storing the methods for each registered object class of a system section. This implies that the method of various objects of the same class needs to be stored only once.

The distribution plane entity 73 contains two different threads 76 and 77. The thread 76 is sufficient for the communication between the object framework software 45 and the distribution plane 44. The other thread 77 receives messages from distribution plane entities not arranged in the respective system section.

The thread 76 receives messages or reports from embedded objects which are assigned to the respective distribution plane entity 73. The messages are received by a single message queue 78. A stub object 79 of the object frame, which contains a message-oriented software interface, supplies the respective messages to the message queue 78.

The thread 76 is responsible for refreshing the two local tables 74 and 75. For this purpose, the thread 76 communicates with all the other distribution plane entities of the distribution plane. Before a new object in the assigned distribution plane entity can be registered, there is to be tested whether this new object will not collide with some other object in the system. Furthermore, the thread 76 is responsible for messages being sent from one object to another object. With an object inside the assigned system section, the communication takes place directly between thread 76 and the respective object in that the message is sent directly to the respective invocation queue. In the other case, the communication takes place via control cells to a distribution plane entity in another system section.

The thread 77 receives messages via a reply queue 80 from a distribution plane entity of other system sections. More specifically, the thread 77 receives replies to method invocations, which invocations originate from the thread 76 and have been sent from a distribution plane entity of another system section.

Furthermore, the distribution plane 44 has the function of informing the management software 42 about changes of the local area network. The distribution plane 44 establishes, for example, the presence of a network node or the loss of a network node and informs the management software 42 thereof. For the distribution plane 44 to be able to fulfil this information task, the presence of the network nodes and stations of the local area network are periodically verified in brief intervals. So-termed "alive" messages are then exchanged between a distribution plane entity and an assigned network node or an assigned station via the internal interface (message queue 78) shown in FIG. 9. If such an "alive" message is not acknowledged by a system section, this is reported to the management software as a non-existing presence of the system section.

A name server of a distribution plane entity further has the task of querying all the name servers of other distribution plane entities during the registration of an embedded object whether the newly embedded object leads to any opposition. The method may then be simplified or made more efficient when the table 74 of the name server of the distribution plane entity has not only stored all the locally embedded objects, but also several remotely embedded objects. Which remotely embedded objects are stored in the table 74 depends on the respective functions of the objects. It is then also necessary for the name server of the distribution plane entity to inform all the other distribution plane entities both about an object registration and an object removal and about whether an object is substituted by another object. The substitution of an object is also carried out by means of the name server.

As discussed above, the object framework software 45 invokes references of objects of which a method is to be invoked. On the distribution plane 44 is first searched the table 74 of the name server of a distribution plane entity which stores at least the locally embedded objects. When the proper object reference is not available in the table 74 assigned to the respective object, all the removed name servers are requested to search their respective tables 74.

It is an task of the information management 43 to produce information about objects of the control and management software 41 and 42 and of the firmware. Since most information, more particularly information about the firmware is generated in different system sections, the information repository software 43 is also realized in a distributed manner.

As discussed above, the information repository software 43 stores the status of the physical plane or hardware respectively, via the firmware. This task is carried out by the information repository software 43 so that it contains objects which are the counterparts of the real hardware or firmware respectively, and will be referenced substitute objects in the following. Once a substitute object has received a message from its real counterpart, it accordingly adapts its status to the changes. Via such a substitute object the information repository software 43 gives the control and management software 41 and 42 access to the hardware or firmware, respectively. A change in the substitute object, which is caused, for example, by the control or management software 41 or 42, will conversely cause a change to occur in the respective counterpart of the hardware or firmware. Making the substitute objects ready for use makes it possible for the other software components of the distributed switching software to be independent of the hardware, because these other software components do not communicate directly with the hardware components.

Figure 10:
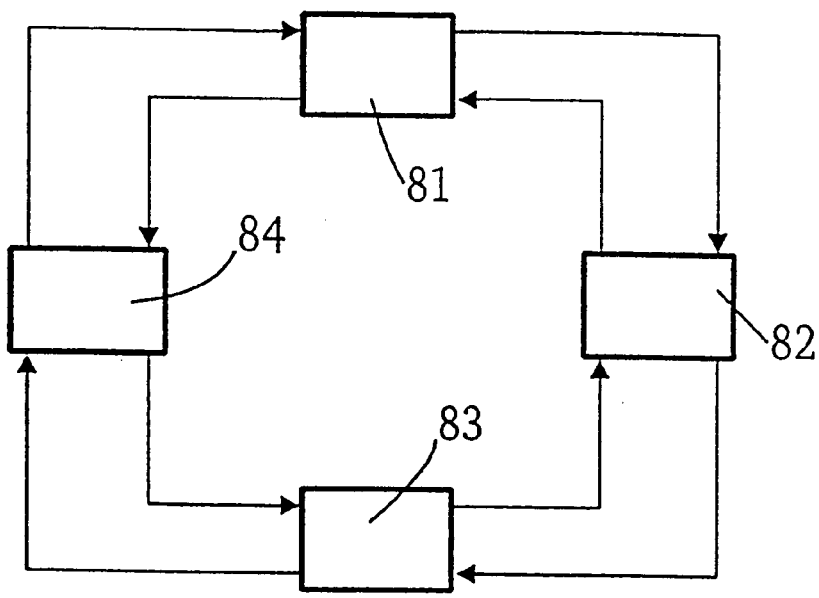
FIG. 10 shows a simple local area network with a double ring and four network nodes.

The mode of operation of the distributed switching software will be further explained in the following by way of an example. FIG. 10 shows a simple local area network including an inner and an outer ring and four network nodes 81 to 84. Each network node 81 to 84 is arranged as shown in FIG. 3.

Figure 11:
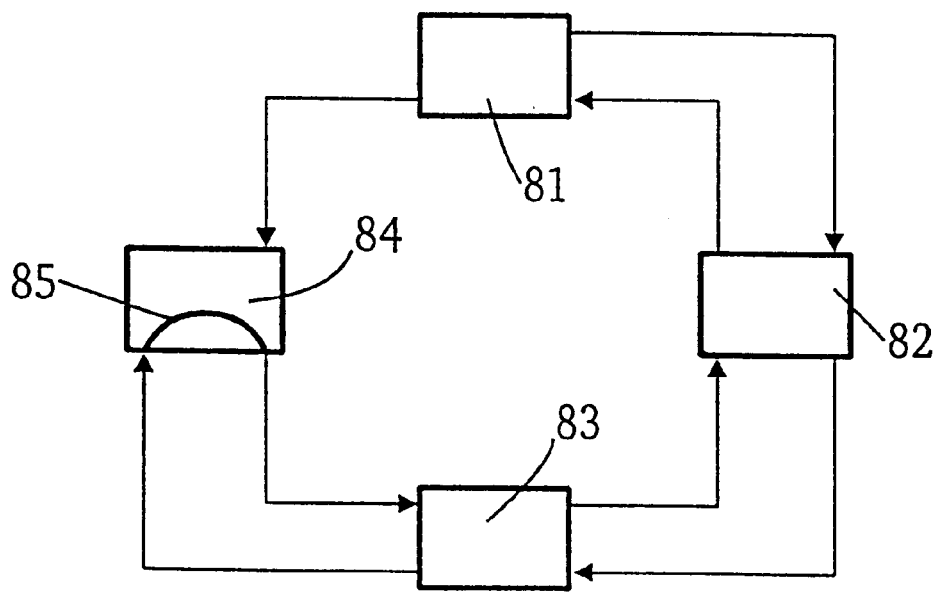
FIG. 11 shows the local area network shown in FIG. 10 with a ring interruption and a loop between inner and outer ring in a network node, FIGS. 12 and 13 give diagrammatic representations of the interactions between various objects for detecting a ring interruption in the local area network shown in FIG. 10 and a representation of a reconfiguration of FIG. 11, and FIGS. 14, 15, and 16 give representations of procedures of the functions and actions of the objects shown in FIGS. 12 and 13.

It is supposed that the distributed switching software is arranged for controlling the cell stream in the case of a ring interruption, so that a network node loops the cells to the other ring prior to the ring being interrupted. For example, as is shown in FIG. 11, the outer ring is interrupted between the network nodes 81 and 84. Once the error has been detected, a loopback 85 from the outer ring to the inner ring is formed in the network node 84. The essential steps which are taken by the distributed switching software for this reconfiguration problem will be described in the following. The distributed switching software contains embedded objects which take over the role of the switching elements 20 to 22 for this problem on each network node 81 to 84. The first and the second respective object for the switching elements 20 and 21 which have ring connections is called a system A1 and A2 respectively, and the existing object for the circuit element 22 which has station connections is called chief CH. The objects A1 and A2 detect local events (for example, ring error) and control the ring access. The object CH assigned to the network node 81 controls the communication with the objects CH which are assigned to the other network nodes 82 to 84, and carries out, for example, the new computation of the tables in the various path memories 16 and 17.

The interaction between the objects A1, A2 and CH or between the objects CH of the various system sections, that is to say, the invocation of methods on another object and the returning of result parameters, is carried out via the distribution plane 44. The embedded objects A1, A2 and CH are registered with the methods which can be invoked by other objects in the respective distribution plane entity and start with their normal operation. Each network node 81 to 84 also contains objects of the information repository software 43, which objects also make it possible for each embedded object to access the system status.

Figure 12:
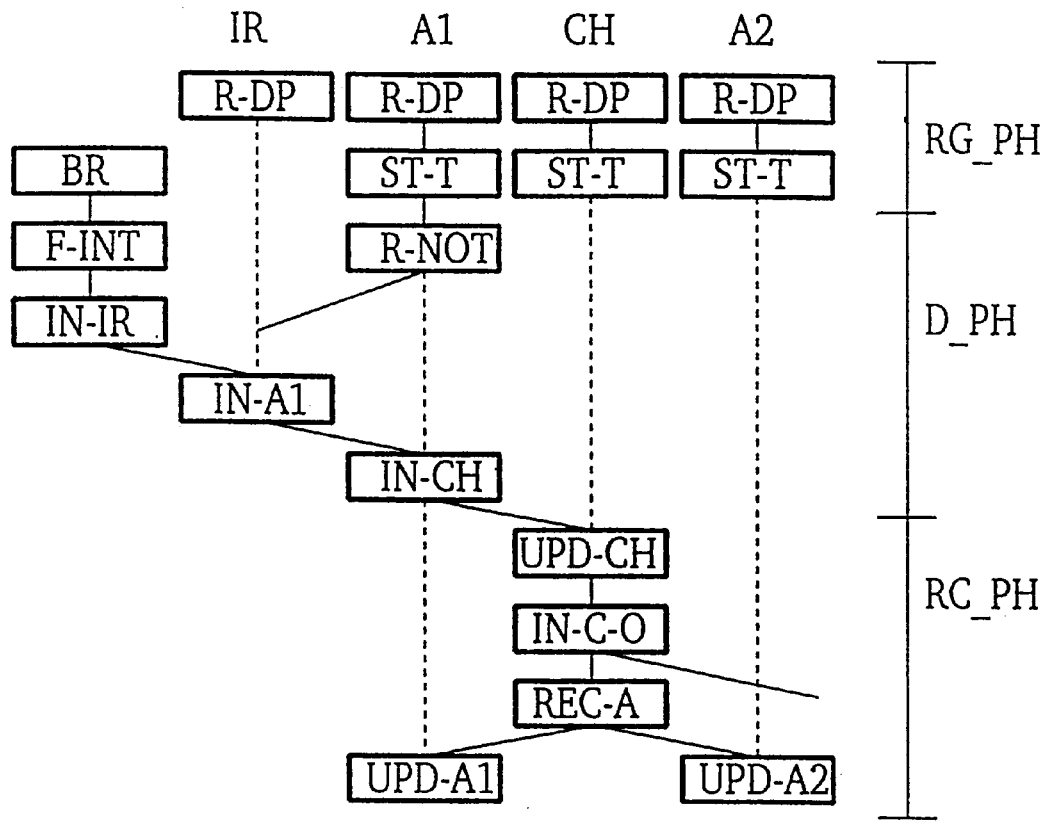
Figure 13:
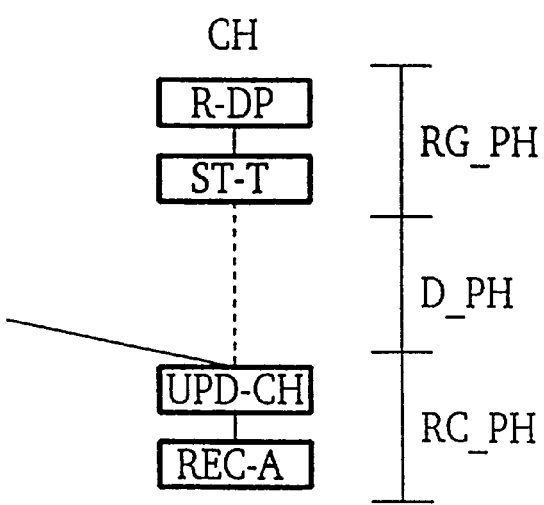

The interactions carried out by the embedded objects A1, A2 and CH after a ring interruption, will be further explained in the following with reference to FIGS. 12 and 13. For completeness' sake, FIGS. 12 and 13 show not only a detection phase D_PH in which the ring interruption is established, and a reconfiguration phase RC_PH, in which, for example, the path tables 17 and 18 (compare FIG. 2) of a circuit element are changed, but also a registration phase RG_PH. During the registration phase RG_PH, the embedded objects A1, A2 and CH and their methods are registered in the respective appropriate distribution plane entity. This registration is indicated by the blocks R-DP in FIGS. 12 and 13. Subsequently, all the threads of the embedded objects A1, A2 and CH are started (block ST-T). Also an object IR of the information repository software 43 is registered on the respective network node. In FIG. 12 are shown the interactions of the network node 81 for the two objects A1 and A2, the object CH and the object IR of the information repository software 43. For clarity, FIG. 12 shows only interactions of the object CH of a network node 82 to 84.

When an interruption of the outer ring is established in network node 81 (block BR), the firmware generates an interrupt (block F-INT). The object A1 which is assigned to the circuit element of the network node 81 connected to the defective ring, informs the object IR (R-NOT) that it is to be informed in the case of a ring error. Via the interrupt, the object IR (block IN-IR) is informed. The object IR informs the object A1 (block IN-A1) and the object A1 the object CH (block IN-CH). These message streams are controlled by the distribution plane 44 and utilize the physical layer in that cells are transmitted between the circuit elements 20 to 22.

At the beginning of the reconfiguration phase RC_PH, the object CH (FIG. 12) evaluates the received information and causes a change of the path memories 16 and 17 to occur in the circuit elements 20 to 22 of the network nodes 81 to 84 (block UPD-CH). This is realized in that the object CH of the network node 81 informs the other objects CH of the network nodes 82 to 84 (IN-C-0) and its assigned assistants (block REC-A) of the fact that the route tables are to be changed. The respective data are also sent along. In FIG. 12 this refreshment of the tables of the assistants A1 and A2 is indicated by blocks UPD-A1 and UPD-A2. In FIG. 13, the block UPD-CH shows only the change in the object CH. A change of the path memories 16 and 17 in the circuit elements 20 and 21 of the network nodes 82 to 84 is also effected via the objects A1 and A2. This change is not shown.

In FIGS. 12 and 13 are shown interactions between embedded objects which communicate about functions among each other which functions are rendered available by the distribution plane 44 and the object framework software 45. The functions and the actions in the registration phase RG_PH of the detection phase D_PH and the reconfiguration phase RC_PH of the embedded objects will be shown in the following descriptions of procedures.

Figure 14:
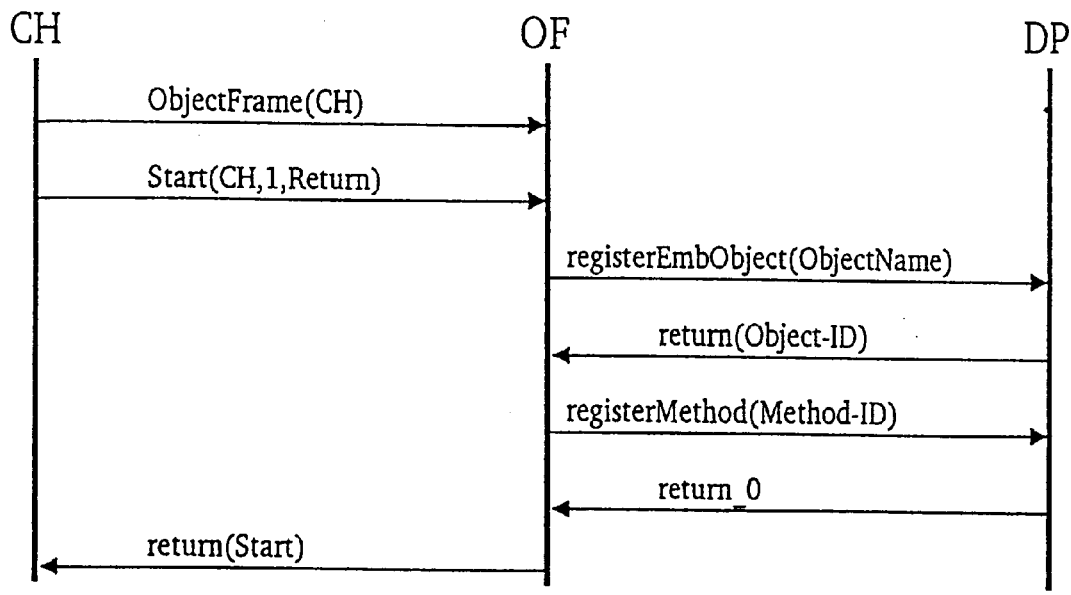

First the procedure during the registration phase RG_PH will be explained with reference to FIG. 14. Only the procedure for the registration of the object CH of one network node will be considered here. The other necessary registration procedures are carried out in similar manner. First the object CH is initialized via the method invocation ObjectFrame(CH) with the appropriate object frame OF, and then an attempt is made to execute the object CH with the object frame OF via the method invocation Start(CH, 1,Return). The number "1" in the latter method invocation denotes that an additional thread is to be started for the message handling via the invocation of the method, and the parameter "Return" denotes that the control is to be returned to the object CH. Via the method invocation register EmbObject(ObjectName), the object frame has the assigned distribution plane entity DP of the distribution plane check whether the object already exists in the local area network. If this is not the case, the distribution plane entity DP stores the object in its object table (compare FIG. 9) and issues an object identification number (ObjectID). Furthermore, a message queue is generated for the new object. The arrow referenced return(Object-ID) gives the return value "Object-ID" to the object frame OF. Once the method invocation registerMethod(Method-ID) has been received, the distribution plane entity DP checks whether the method to be registered has already been registered in a table under a method identification number Method-ID (compare FIG. 9). If this is not the case, the method identification number is included in the table. Subsequently, all the threads necessary for the object CH are generated and started and the control is given back to the object CH via the return value Return_0 and Return(start).

Figure 15:
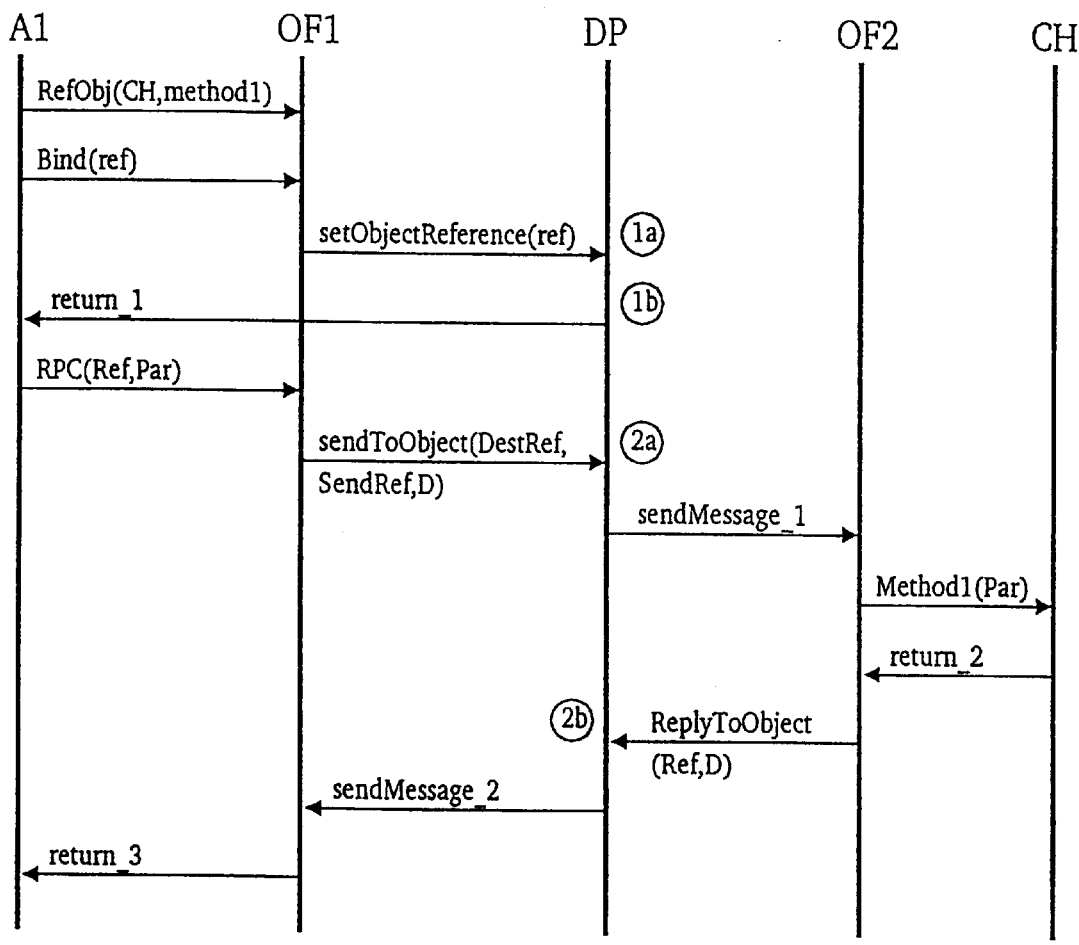

During the detection phase D_PH, there are only interactions between objects of one network node. In FIG. 15 is shown the procedure for the interactions between the object A1 and the object CH when a ring interruption is detected. The interactions between the objects A1 and CH and the interactions with the information repository software take place in similar manner. With reference to FIG. 15 it was presupposed that the objects A1 and CH and the method to be invoked of the object CH have already registered with the appropriate distribution plane entity DP.

Figure 16:
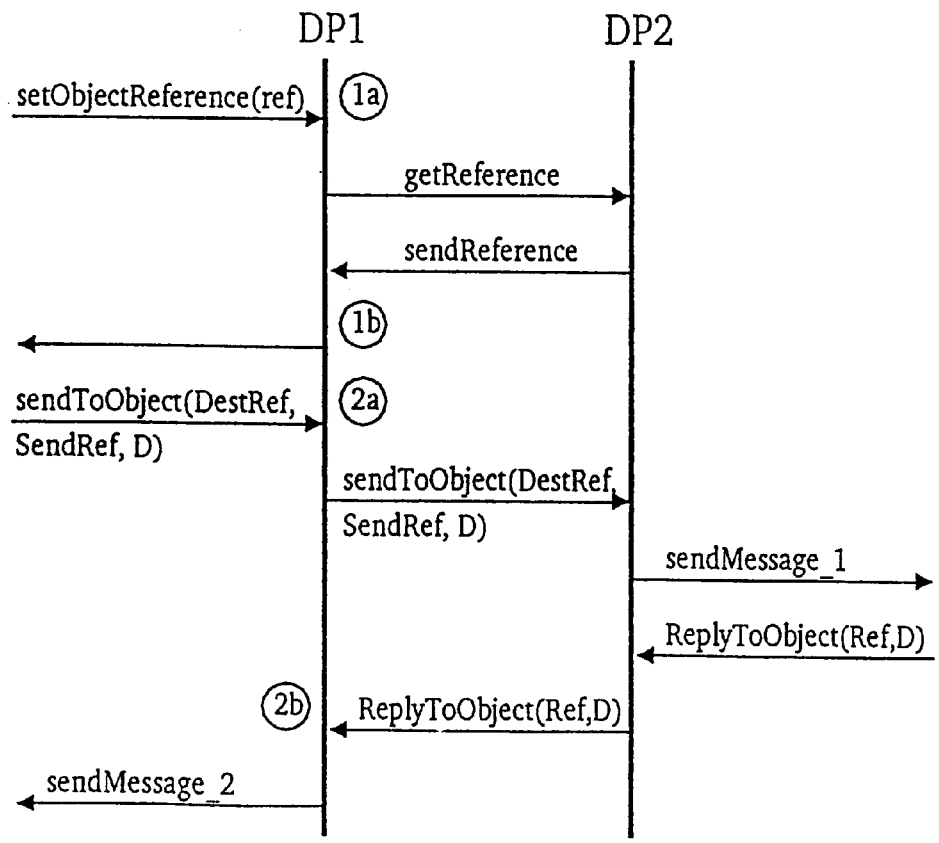

In the object frame OF, a reference object for the method method1 of the object CH is generated via the method invocation RefObj(CH),method1), and the object reference ref is bound to the object instant via the method invocation Bind(ref). The object frame OF1 assigned to the object A1 passes on the method invocation setObjectReference(R-EF) to the distribution plane entity DP, so that an object instant for the addressed object identification number is searched for. If the object instant is situated on the network node assigned to the distribution plane entity DP, the control is returned to the object A1. In the other case, distribution plane entities of other network nodes are to be queried whether the object identification number is stored there. The respective interface of FIG. 16 is denoted 1*a* in FIG. 15. Subsequently, the control is returned to the object A1. Here too, an interface 1*b* is available through which the control is returned by a distribution plane entity of another network node.

The next method invocation RPC(Ref,Par) which is used by the embedded object A1 is to invoke a method in the object CH (RPC=remote procedure control). The parameter Ref refers to the method that is to be invoked in the object CH. The parameter Par contains the entry parameter of the method. The object frame OF1 then carries out the method invocation sendToObject(DestRef,SendRef,D) with which a message is sent to the addressed object. The parameter DestRef denotes the invoked object CH, the parameter SendRef the invoked object A1 and the parameter D entry data for this invocation. If the addressed object is available on the network node assigned to the object A1, the respective method of the addressed object is called (sendMessage_1). In the other case, where the addressed object is situated on another network node, the method is carried on in another network node (interface 2*a*). The object frame OF2 assigned to the object CH invokes the method Method1 via the respective parameter PAR so that the object CH is processed. The result of the execution of the method is sent back by the object CH to the object frame OF2 (return_2) and by the object frame OF2 via the method invocation ReplyToObject(Ref,D) to the distribution plane entity DP. Since the target object (object A1) is situated on the same network node, its message queue is identified and a message with a return parameter is sent to the object frame OF1 of the object A1 (sendMessage_2). Here is available another interface 2*b* through which return parameters are transmitted by a distribution plane entity of another network node, in the case where the invoked method is situated on that network node. The return parameters are transferred after identification of the thread of the calling object (return_3) and the thread is released.

In the reconfiguration phase RC_PH, not only the interactions of objects on an assigned network node, but also interactions between objects that are not situated on the same network node are necessary (as in the detection phase D_PH). In that case, interactions are carried out by means of cells. In the following example, the object CH on a first network node invokes a method of the object CH on another network node. This procedure is similar to the one shown in FIG. 15. The differences are shown in FIG. 16. A communication with the distribution plane entities DP1 and DP2 of two different network nodes is carried out on the distribution plane. The distribution plane entity DP1 receives the method invocation setObjectReference(Ref) and then searches for the object instance for the addressed object identification number. At this point lies the interface 1*a,* that is to say, the procedure up to this interface corresponds to that shown in FIG. 15. If the searched object instance in the network node having the distribution plane entity DP1 is registered, this object instance obtains the object reference (getReference) and gives an acknowledgement about the return parameter sendReference to the distribution plane entity DP1. Here is then the interface 1*b.* The procedure then again corresponds to that of FIG. 15 up to interface 2*a.* The message which is sent via the method invocation sendToObject(DestRef, SendRef,D) to the interface 2*a* is sent by the distribution plane entity DP1 via the method invocation sendToObject (DestRef,SendRef,D) to the distribution plane entity DP2. Subsequently, the respective method is invoked via the message sendMessage__1, finalized and the result parameter is sent via the distribution plane entity DP2 to the interface 2*b* by means of the method invocation ReplyToObject(Ref, D).

Figure 17:
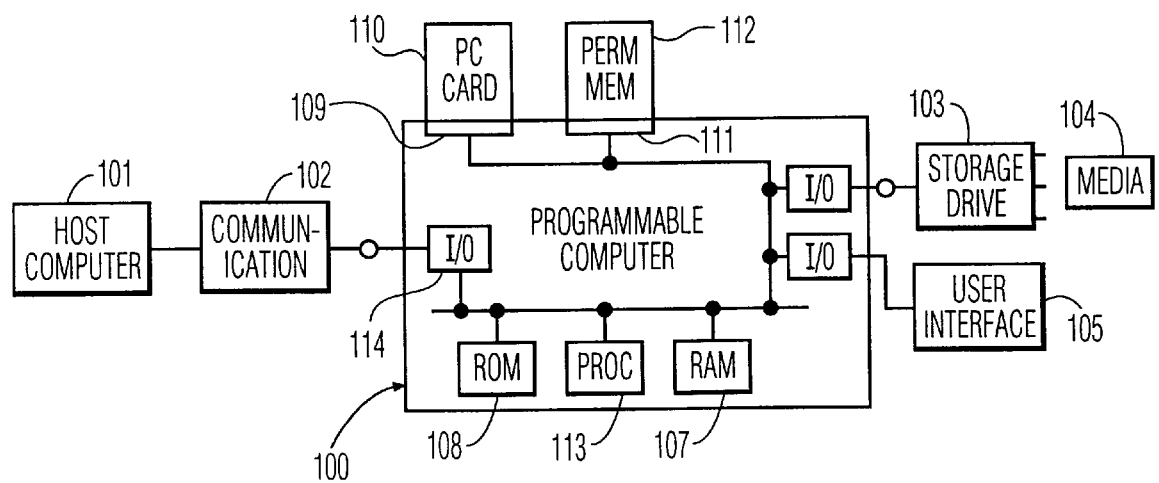
FIG. 17 shows a programmable computer.

FIG. 17 illustrates a programmable computer system 100 and various example apparatus for programming such programmable computer which are all well known in the art. The computer system may be programmed either by connecting non-volatile memory (e.g. ROM, PROM, EEPROM, flash memory, battery backed SRAM) containing programmed structures to the programmable computer or by providing signals to the programmable computer which may be applied to memory of the programmable computer to provide programmed structures. Another computer system 101 such as an internet server may be connected through a communication appparatus 102 to system 100 to provide signals for programming system 100. Apparatus 102 may include a copper or optic cable, radio, infrared, or network such as Ethernet, ARCnet, Token ring, or amodem and telephone system. A storage drive 103 may have integral media 104 and be removable attached to system 100 or drive 103 may be integral with system 100 and recieve signals form removable computer media 104. System 100 may include a user interface 105 and program input module 106, and written materials may be provided. A user may input the signals using apparatus (not shown) of the user interface such as a keyboard, text scanner, microphone, camera or bar code reader. The signals provided to system 100 may be copied to storage drive 103 for later recall into volatile memory 107 or stored in non-volatile memory 108 to provide programmed apparatus in memory. Alternately the system may be programmed by providing programmed non-volatile memory. System 100 may include a slot 109 into which a cartridge 110 containing non-volatile memory such as a PC flash memory card, mayh be connected to provide programmed apparatus. System 100 may include a socket 111 into which a non-volatile package 112 may be inserted to provide programmed apparatus. System 100 may be fabricated with non-volatile integral memory 108 to provide programmed apparatus. The programmed structures include programs and other data in memory which control a micro-processor 113 and I/O processors e.g. 114 of the programmable computer to implement computer processes. The computer system may be a workstation, modem, PC card, printer, or other software upgradable component. Other well known methods of programming a computer system may also be used.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A local area network comprising:

a plurality of network nodes, and means for multiple applications to operate on the nodes and in which:

network nodes are coupled to a station and/or another network node the network nodes include means for switching packets generated by a station or a network node, the switching means include switching software means distributed over multiple network nodes and stations, the distributed switching software means include means to provide an object available for each respective application, the network includes object framework software means for the available object to be combined with a component of the object framework software means for object registration and for routing messages to and from the object, and the distributed switching software means is a distribution plane entity for transmitting and controlling the messages between objects in a station or a network node and another distribution plane entity.

2. The local area network as claimed in claim 1, in which:

the network includes first object means for an application for reporting its presence and its methods to the assigned distribution plane entity by a component of object framework software, the component of object framework software means includes at least one thread means for the execution of a method, the thread means include means for receiving a message for invoking a method of a second object if this method is a method of the first object, and the component of object framework software includes at least one thread means for handling a reply from a third object after the execution of a method and for sending a reply to the waiting thread for the execution of a method.

3. The local area network as claimed in claim 2, in which the component of object framework software means include means for storing all the methods of an object in a list the component of object framework software include invoke queue means for transferring messages from an object to at least one thread for the execution of a method, and the thread means include means for searching the list after a corresponding message has been received and for executing the method, if the method is stored in the list.

4. The local area network as claimed in claim 1, in which a distribution plane entity includes a first thread means for communication with the components of object framework software of an assigned network node or an assigned station and for sending messages to another distribution plane entity, and for storing objects of the network node and of the station in a first table and methods of the objects in a second table, and the network further comprises second thread means for receiving messages from another distribution plane entity.

5. A local area network as claimed in claim 4, in which the first thread means is also for receiving messages from a component of object framework software via a message queue, and for testing whether an object will not collide with another object and for storing the object in the first table if this object does not collide with another object.

6. The local area network as claimed in claim 4, in which the second thread means is also for receiving messages via a reply queue from another distribution plane entity; and messages are replies to method invocations from the first thread.

7. A local area network as claimed in claim 4, in which the first thread means is also for storing objects of another network node and of another station.

8. The local area network as claimed in claim 4, in which the first thread means is also for transferring special messages to the objects of the assigned network node or of the assigned station, and for establishing the presence of the network node or of the station, and the network node or the station will not be present, if the first thread does not receive the special message from the network node or from the station.

9. Apparatus for providing programmed nodes in a network, comprising:

means for providing switching software means distributed over multiple network nodes and stations, including means to provide an object available for each respective application, means to provide object framework software means for the available object to be combined with a component of the object framework software means for object registration and for routing messages to and from the object, and the distributed switching software means is a distribution plane entity for transmitting and controlling the messages between objects in a station or a network node and another distribution plane entity.

10. The apparatus of claim 9 consisting essentially of programmed software distribution apparatus selected from the group including: removable computer media, a removable media drive, a memory package, a memory cartridge, a PC memory card, and a computer node or station for connections to the network.

* * * * *